United States Patent
Angeles et al.

(10) Patent No.: US 9,648,676 B2
(45) Date of Patent: May 9, 2017

(54) BLEEDER CIRCUIT EMULATOR FOR A POWER CONVERTER

(71) Applicant: Power Integrations, Inc., San Jose, CA (US)

(72) Inventors: Christian Angeles, San Jose, CA (US); Jose Requinton Del Carmen, Jr., San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 71 days.

(21) Appl. No.: 14/498,413

(22) Filed: Sep. 26, 2014

(65) Prior Publication Data

US 2015/0137704 A1 May 21, 2015

Related U.S. Application Data

(60) Provisional application No. 61/906,298, filed on Nov. 19, 2013.

(51) Int. Cl.
*H05B 33/08* (2006.01)
*H02M 3/156* (2006.01)
*H02M 1/00* (2006.01)

(52) U.S. Cl.
CPC ......... *H05B 33/0815* (2013.01); *H02M 3/156* (2013.01); *H02M 2001/0006* (2013.01); *H02M 2001/0022* (2013.01); *H02M 2001/0025* (2013.01)

(58) Field of Classification Search
None
See application file for complete search history.

(56) References Cited

U.S. PATENT DOCUMENTS

| 8,242,766 B2 * | 8/2012 | Gaknoki | H05B 33/0815 323/246 |
| 8,476,847 B2 * | 7/2013 | Riesebosch | H05B 33/089 315/291 |

(Continued)

FOREIGN PATENT DOCUMENTS

WO    WO 2011/042510 A2    4/2011

OTHER PUBLICATIONS

PCT/US2014/023741—PCT International Search Report and Written Opinion, mailed May 26, 2014 (13 pages).
Vaughan et al., U.S. Appl. No. 61/777,339, filed Mar. 12, 2013.

*Primary Examiner* — Alexander H Taningco
*Assistant Examiner* — Nelson Correa
(74) *Attorney, Agent, or Firm* — Blakely Sokoloff Taylor & Zafman LLP

(57) ABSTRACT

A bleeder circuit emulator for use in a power converter to compensate and increase the current demand from the Triac dimmer above its holding current. The circuit includes an input voltage modifier and a leading edge dimming detection circuit. The input voltage modifier receives an input voltage signal that is representative of a magnitude of an input voltage of the power converter and selectively provides a modified input voltage signal to an input of a controller in response to receiving a control signal. The modified input voltage signal is representative of a value that is less than the magnitude of the input voltage. The leading edge dimming detection circuit generates the control signal to engage the input voltage modifier to generate the modified input voltage signal in response to detecting leading edge dimming at an input of the power converter.

19 Claims, 9 Drawing Sheets

(56) References Cited

U.S. PATENT DOCUMENTS

| | | | | |
|---|---|---|---|---|
| 8,581,498 B1* | 11/2013 | Cheung | H05B 33/0815 |
| | | | | 315/119 |
| 8,624,514 B2* | 1/2014 | Kang | H05B 33/0851 |
| | | | | 315/200 R |
| 8,723,431 B2* | 5/2014 | Deppe | H05B 33/0815 |
| | | | | 315/185 R |
| 8,829,819 B1* | 9/2014 | Angeles | H05B 33/0815 |
| | | | | 315/219 |
| 8,847,517 B2* | 9/2014 | Sutardja | H05B 33/0815 |
| | | | | 315/224 |
| 8,853,954 B2* | 10/2014 | Otake | H05B 33/0845 |
| | | | | 315/200 R |
| 9,000,683 B2* | 4/2015 | Del Carmen, Jr. | H05B 33/0815 |
| | | | | 315/185 R |
| 9,210,744 B2* | 12/2015 | Del Carmen, Jr. | H05B 33/0809 |
| 9,282,606 B1* | 3/2016 | Kuang | H05B 33/0815 |
| 9,543,845 B2* | 1/2017 | Del Carmen, Jr. | H02M 3/33507 |
| 2008/0018261 A1 | 1/2008 | Kastner | |
| 2011/0241557 A1 | 10/2011 | Grotkowski et al. | |
| 2012/0280629 A1 | 11/2012 | Gaknoki et al. | |
| 2013/0049622 A1 | 2/2013 | Angeles | |
| 2013/0278159 A1* | 10/2013 | Del Carmen, Jr. | H05B 33/0809 |
| | | | | 315/200 R |
| 2014/0239849 A1* | 8/2014 | Del Carmen, Jr. | H05B 33/0815 |
| | | | | 315/307 |
| 2014/0333228 A1* | 11/2014 | Angeles | H05B 33/0815 |
| | | | | 315/291 |

* cited by examiner

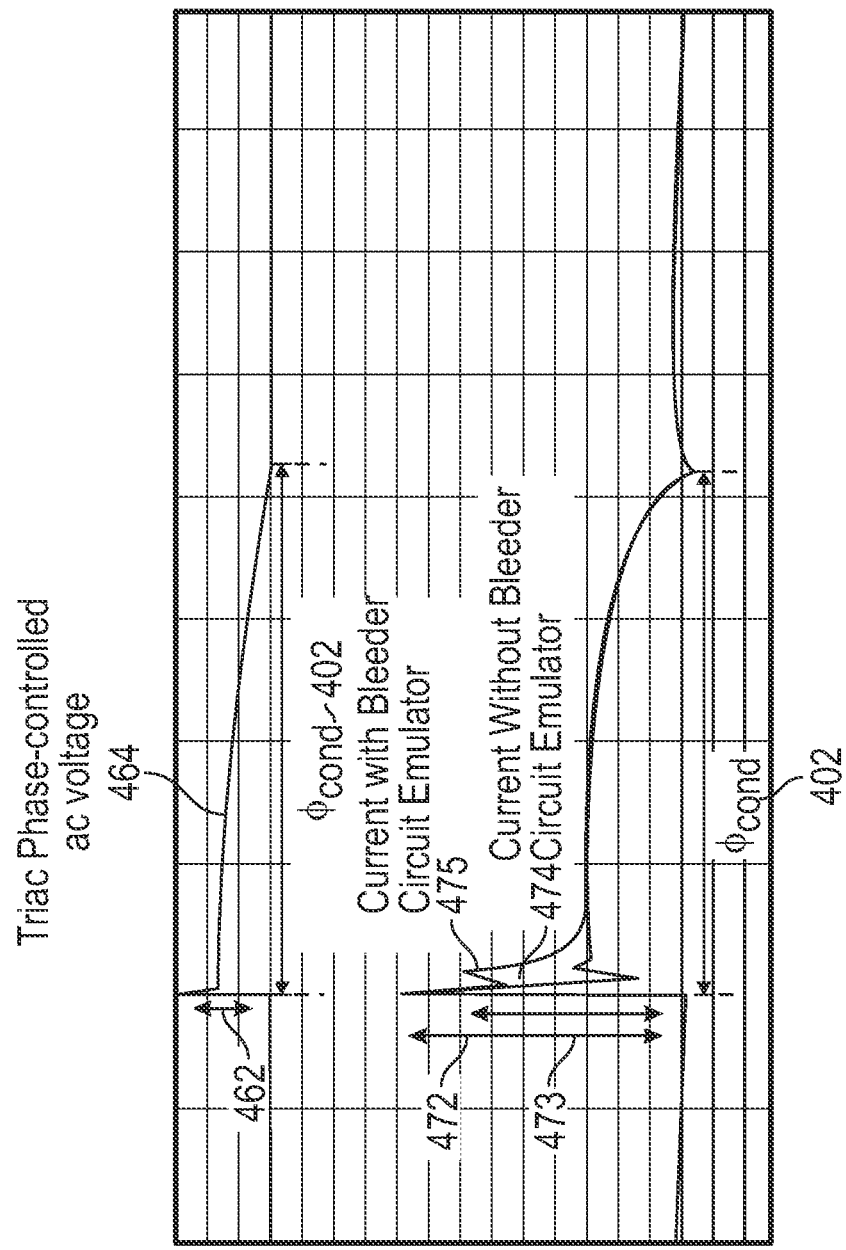

BLEEDER CIRCUIT EMULATOR FOR A POWER CONVERTER

CROSS-REFERENCE TO RELATED APPLICATION

This application claims the benefit of U.S. Provisional Application No. 61/906,298, filed Nov. 19, 2013.

FIELD OF DISCLOSURE

This disclosure relates to power converters and, more particularly, to power converters that drive light emitting diode (LED) lighting with triac dimming circuitry.

BACKGROUND

Light emitting diode (LED) lighting has become very popular in the industry due to their many advantages including a longer lifespan, fewer hazards and increased visual appeal when compared to other lighting technologies, such as for example compact fluorescent lamp (CFL) or incandescent lighting technologies. The advantages provided by LED lighting have resulted in LEDs being incorporated into a variety of lighting technologies, televisions, monitors and other applications that may also require dimming.

One known technique for dimming is the use of a triac or phase angle dimming. A triac circuit operates by removing some beginning or ending portion of each half-cycle of ac power, which is known as "leading edge or trailing edge phase control" respectively. By eliminating some portion of each half-cycle, the amount of power delivered to the lamp is reduced and the light output appears dimmed to the human eye. In most applications, the missing portion of each half-cycle is not noticeable to the human eye because the variations in the phase controlled line voltage and the variations of power delivered to the lamp occur so quickly. While the triac dimming circuits work especially well to dim incandescent light bulbs when they are used for dimming LED lamps they are likely to produce non-ideal results, such as flickering, blinking, color shifting and input waveform distortions.

A difficulty in using triac dimming circuits with LED lamps comes from a characteristic of the Triac itself. A Triac behaves as a controlled ac switch that is open until it receives a trigger signal at a control terminal, which causes the switch to close. The switch remains closed as long as the current through the switch is above a value referred to as the holding current. Most incandescent lamps easily draw more than the minimum holding current from the ac power source to enable reliable and consistent operation of a triac. However, the LEDs low currents may not be enough compared to the minimum holding currents required to keep Triac switches conducting for a reliable operation.

Even though the triac-based, leading or trailing edge phase control dimmer LED drivers may provide light dimming with a low cost, since the current drawn by the string/array of LED lamps may easily go below the holding current of the triac dimming circuit, it may cause the undesirable behavior including limited dimming range, flickering and input waveform distortions. The Triac may fire inconsistently as a result of the low current drawn by the LED string/array. In addition, due to the inrush current charging the input capacitance and because of the relatively large impedance that the string/array of LEDs presents to the line, a significant ringing may occur whenever the Triac turns on. This ringing may cause even more undesirable behavior as the Triac current could fall to zero and turn off the string/array of LEDs, resulting in flicker.

As a consequence, the LED driver may include a compensator circuit (e.g., a bleeder, or dummy load/preload) to increase current demand from the Triac dimmer. A bleeder circuit is in fact a dummy load of passive or active components added at the input or output to take enough extra current in addition to the LEDs to keep the Triac conducting reliably after it is triggered. Low cost passive bleeders are common and popular in LED driver circuits but have associated penalties in efficiency and performance.

BRIEF DESCRIPTION OF THE DRAWINGS

Non-limiting and non-exhaustive embodiments of the present invention are provided in the following figures, wherein like reference numerals refer to like parts throughout the various views unless otherwise specified.

FIG. 4C illustrates example waveforms of an ac input voltage, and a comparison of rectified input currents with and without a bleeder circuit emulator, in accordance with the teachings of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality.

Embodiments of the present disclosure include a bleeder circuit emulator that includes a leading edge dimming detection circuit to recognize when a power converter is operating with leading edge phase control. In one example, the leading edge dimming detection circuit detects the leading edge dimming and then generates a control signal to engage an input voltage modifier that then provides a modified input voltage signal to a controller of the power converter. In response to the modified input voltage signal the controller may adjust a parameter of the power switch (e.g., switching frequency and/or duty cycle, etc.) such that an input current of the power converter is maintained above a minimum threshold (e.g., holding current of Triac dimming circuit).

Figure 1A:
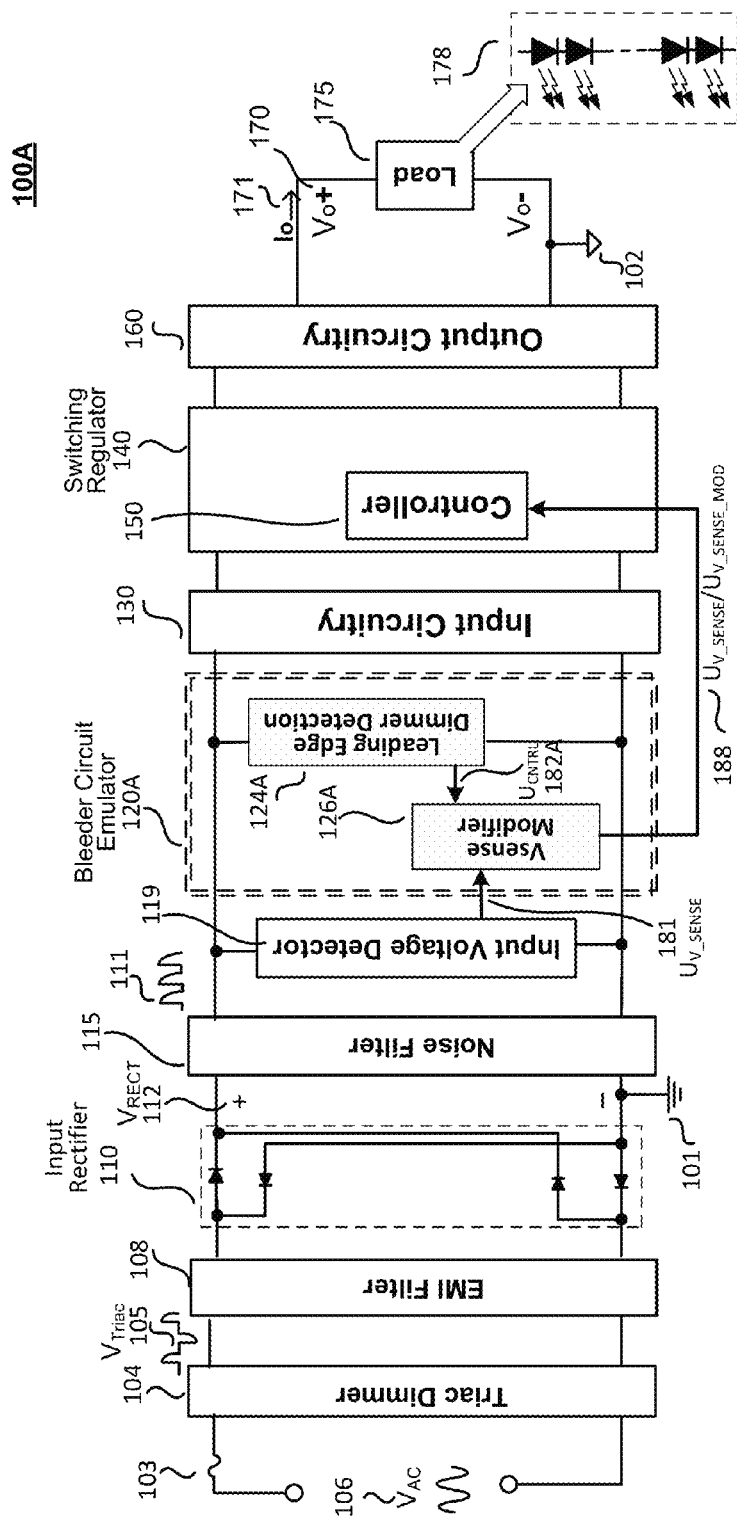
FIG. 1A is an example functional block diagram illustrating a power converter having a bleeder circuit emulator, in accordance with the teachings of the present disclosure.

FIG. 1A is an example functional block diagram illustrating a power converter 100A having a bleeder circuit emulator 120A, in accordance with the teachings of the present disclosure. In one example, load 175 includes an array of light emitting diodes (LEDs) 178, such that power converter 100A may be referred to as an LED driver 100A. In the example of FIG. 1A, LED driver 100A is coupled to a Triac dimmer circuit 104 which is coupled to receive a full sinusoidal waveform 106 at input ac line signal $V_{AC}$ 106. In one embodiment, the input terminal is coupled to an optional fusible protection device 103. Triac dimming circuit 104 may apply a phase controlled voltage, either by removing (e.g., delaying) the beginning of each half-cycle of the input ac line signal $V_{AC}$ (herein referred to as leading edge dimming) or by removing the end portion of each half-cycle of input ac line signal $V_{AC}$ (herein referred to as trailing edge dimming), to produce a phase controlled Triac signal 105. Triac signal 105 is provided through the electromagnetic interference (EMI) filter 108 which is then coupled to the input rectifier bridge 110. By eliminating a portion of each half-cycle of the input ac line signal $V_{AC}$ 106, the amount of power delivered to the load 175 is reduced and the light output of the LED appears dimmed.

As shown in the depicted example, the rectified voltage $V_{RECT}$ 112 produced by the rectifier bridge 110 and filtered by the noise filter 115 has a symbolic waveform 111 with a conduction phase angle in each half line cycle that is controlled by the triac circuit 104. The input voltage detector block 119 across the rectified input voltage 112 generates a voltage sense signal $U_{V\_SENSE}$ 181 which is representative of the input voltage. In one embodiment in the absence of dimming or when the phase angle control of Triac dimmer 104 is not activated the voltage sense signal $U_{V\_SENSE}$ 181 is representative of an amplitude of AC input voltage. In another embodiment when the phase angle control of Triac dimmer 104 is activated the magnitude of the phase controlled ac input voltage 105 may be reduced such that the input voltage sense signal $U_{V\_SENSE}$ 181 is representative of a magnitude of Triac phase controlled voltage $V_{TRIAC}$ 105. The bleeder circuit emulator 120A includes a $V_{SENSE}$ modifier block 126A and a leading edge dimmer detection block 124A which is coupled across the phase controlled rectified input voltage 112. In one embodiment, leading edge dimmer detection block 124 generates a control signal $U_{CNTRL}$ 182 upon detecting the rising edge of the rectified input voltage 112 due to a Triac dimmer 104 turn-on event. Control signal $U_{CNTRL}$ 182, in one example, may be used to engage the $V_{SENSE}$ modifier block 126A to modify the input voltage sense signal 181. In the illustrated example, the $V_{SENSE}$ modifier block 126B receives the voltage sense signal $U_{V\_SENSE}$ 181 from the input voltage detector block 119 and generates a modified input signal 188 for the controller 150 to compensate for the holding current at triac dimming leading edge phase control. Under operating conditions without leading edge dimming, the control signal $U_{CNTRL}$ 182A does not engage $V_{SENSE}$ modifier block 126B and the signal 188 at the output of the $V_{SENSE}$ modifier block 126A is unmodified voltage sense signal $U_{V\_SENSE}$ 181. However, at the leading edge dimming condition as indicated by activation of the signal $U_{CNTRL}$ 182A, the $V_{SENSE}$ modifier block 126A modifies the signal $U_{V\_SENSE}$ 181 and the generated output signal 188 is a modified signal $U_{V\_SENSE\_MOD}$ that is provided to the controller 150.

The output of the bleeder circuit emulator 120A couples through some optional input circuitry 130 to a switching regulator (i.e., power converter) 140 that includes a controller 150. Output circuitry 160 applies output voltage $V_o$ 170 and output current $I_o$ to the load 175 that in one example is an array 178 of LEDs. In one embodiment, switching regulator 140 is an isolated converter where the secondary side ground 102 differs from the primary ground 101.

Figure 1B:
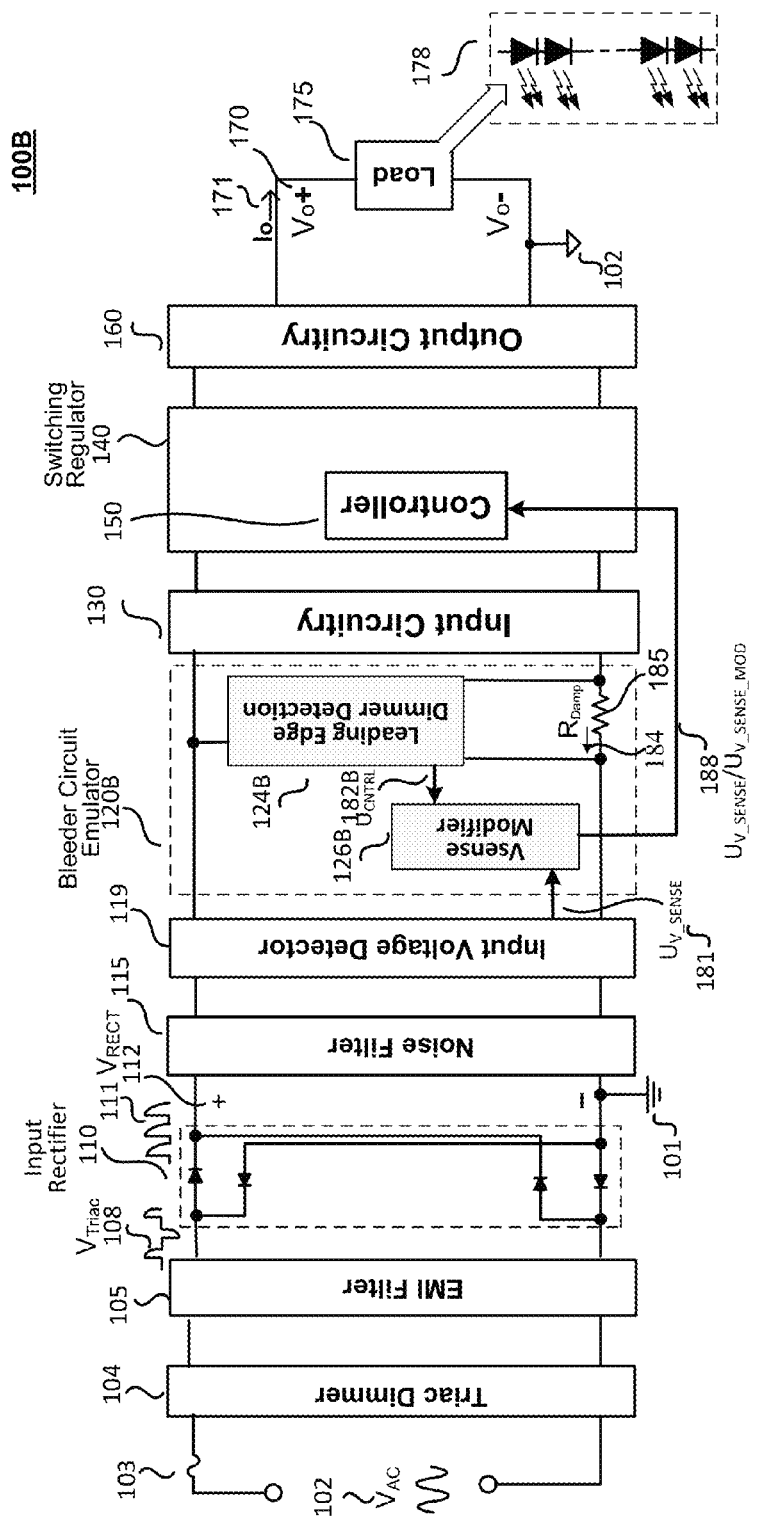
FIG. 1B is an example functional block diagram illustrating a power converter having a bleeder circuit emulator, in accordance with the teachings of the present disclosure.

FIG. 1B is an example functional block diagram illustrating a power converter having a bleeder circuit emulator, in accordance with the teachings of the present disclosure. As shown in FIG. 1B, the leading edge dimmer detection block 124B is coupled to receive a voltage drop across damper resistor 185. In operation, a spike in current 184 through damper resistor 185 may occur as a result of a turn on event of Triac dimmer 104. This turn on spike may be utilized as an indicator for the leading edge dimmer detection circuit 124B detecting leading edge dimming.

The leading edge dimmer detection block 124B generates the control signal $U_{CNTRL}$ 182B to engage the $V_{SENSE}$ modifier block 126B in response to detecting leading edge dimming. Under operating conditions without dimming, the control signal $U_{CNTRL}$ 182A may not be activated, such that the $V_{SENSE}$ modifier block 126B outputs signal 188, which is representative of the input voltage sense signal $U_{V\_SENSE}$ 181 at its input. On the other hand under dimming conditions, the control signal $U_{CNTRL}$ 182A may be activated such that the modifier block 126B is engaged to modify the signal $U_{V\_SENSE}$ 181 in order to generate a modified input voltage sense signal 188 $U_{V\_SENSE\_MOD}$. In one embodiment, the modified input voltage sense signal 188 is provided to the controller 150 to emulate a bleeder circuit such that the controller maintains a minimum input current of the power converter (e.g., a minimum Triac holding current).

Figure 2A:
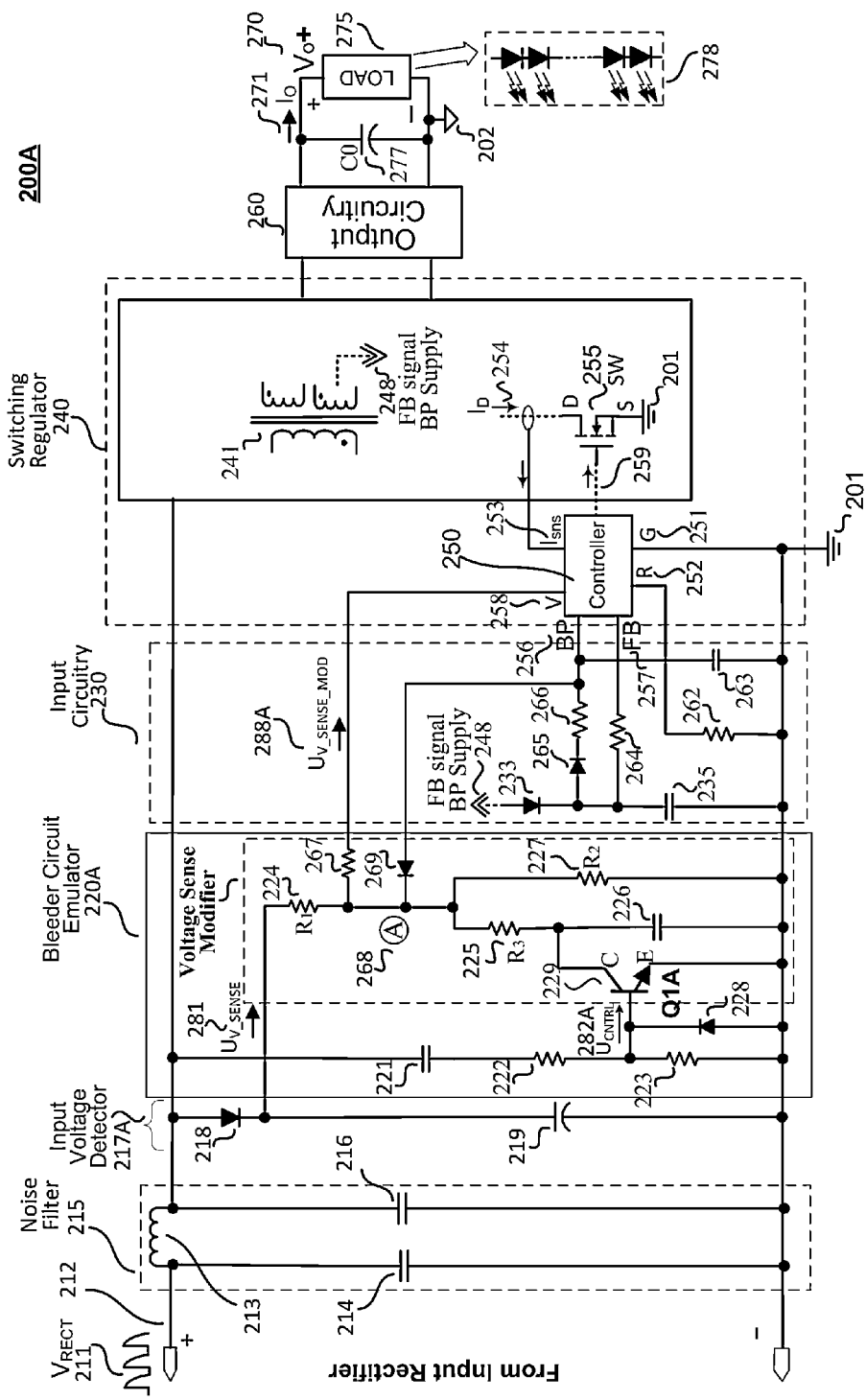
FIG. 2A is an example schematic diagram illustrating a power converter showing more detail of a bleeder circuit emulator, in accordance with the teachings of the present disclosure.

FIG. 2A is an example schematic diagram illustrating a power converter 200A showing further detail of a bleeder circuit emulator 220A, in accordance with the teachings of the present disclosure. Bleeder circuit emulator 220A is one possible implementation of bleeder circuit emulator 120A of FIG. 1A. Input terminal 212 from input rectifier receives the phase controlled rectified input voltage 211 that through an optional noise filter 215 (in one example pi filter of inductor 213 and Y-caps 214 and 216) is transferred to the input voltage detector circuit 217 and the bleeder circuit emulator 220A. The input voltage detector circuit 217A in one example may include a diode 218 charging a capacitor 219 to the magnitude value of the phase controlled rectified input voltage 211 in order to output a sensed voltage signal $U_{V\_SENSE}$ 281.

The bleeder circuit emulator 220A includes a leading edge dimmer detection circuitry, that in example of FIG. 2A, includes capacitor 221 and resistors 222 and 223. As shown, the leading edge dimmer detection circuitry is coupled to output a control signal $U_{CNTRL}$ 282A. Bleeder circuit emulator 220A further includes a voltage sense modifier circuitry that in example of FIG. 2A receives the $U_{V\_SENSE}$ signal 281 across resistor R1 224. Also included in the voltage sense modifier circuitry are resistor R2 227, resistor R3 225, and capacitor 226. The magnitude value of the phase controlled rectified input voltage across the capacitance 219 is applied to a resistor divider of resistors R1 224 and R2 227 and a portion of this voltage at node "A" 268 is applied to resistor R3 225 and capacitor 226. As long as the transistor switch Q1 229 across the capacitance is not activated (open), the capacitor 226 remains charged and the divider voltage at node "A" 268 is $V_A = U_{V\_SENSE} * R2/(R1+R2)$.

In one embodiment, the voltage at node "A" 268 represents a magnitude of the phase controlled rectified input voltage. As is shown in FIG. 2A, the voltage at node "A" 268 is transferred through a resistor 267 (as a current signal $U_{V\_SENSE\_MOD}$ 288A) to terminal V 258 of the controller 250 for processing of input voltage information. The reverse diode 269 from bypass terminal BP 256 to node "A" limits the voltage at node "A" such that it will not go below the BP terminal voltage.

Controller 250 may receive other signals from the switching regulator on its other terminals through the input circuitry 230 components. For example, the third winding of the energy transfer element 241 generates a voltage 248 as a FB signal that is representative of the output. In one example, the voltage 248 may also provide a bypass supply for different blocks of the controller 250. FB signal through resistor 264 is coupled to FB terminal 257 and bypass supply voltage 248 through diode 265 and resistor 266 is couple to BP terminal 256. Capacitor 263 across the BP terminal filters the noise and ripple and stabilizes the supply voltage to the controller. Current signal 254 representative of a current through the switching element 255 is coupled to terminal 253 $I_{sns}$. Ground terminal 251 G of the controller 250 at primary/input side is referenced to primary ground 201. Modes of operation may be defined/programmed through the value of resistor 262 coupled across the multi-function terminal R 252 of the controller 250.

Transistor switch Q1A 229 is coupled across capacitor 226 and may be engaged (e.g., turned on) upon receiving the control signal $U_{CNTRL}$ 282A on its control terminal. Transistor switch Q1 229, when engaged, turns on to make a short circuit across capacitor 226 to discharge it, in which case resistor R3 225 becomes parallel to resistor R2 227 and voltage ratio of the resistive divider changes (reduces) to $V_A = U_{V\_SENSE} * (R_2 \| R_3)/[R_1+(R_2 \| R_3)]$.

In one embodiment, activation of the control signal $U_{CNTRL}$ 282A only happens in response to detection of leading edge dimming by the leading edge dimmer detection circuit, that in example of FIG. 2A includes capacitance 221 and a resistive divider formed by resistors 222 and 223. At a rising edge of the rectified phase controlled input voltage, capacitor 221 behaves as a low impedance/short circuit and thus enables control voltage through the divider resistors 222 and 223 to generate a high enough control signal $U_{CNTRL}$ 282A to turn on the control switch (e.g., transistor Q1A 229). As described above, engagement of transistor Q1A 229 discharges capacitor 226 to reduce the voltage at node "A" 268 and generates a modified input voltage sense signal $U_{V\_SENSE\_MOD}$ 288A to the V terminal 258 of the controller 250. Diode 228 across the control (base) terminal of transistor Q1A 229 clamps the negative oscillating voltage on the control terminal for a stable operation.

Controller 250 processes the received signals and in response thereto, generates a switching signal 259 to control switching of the switching element SW 255 to regulate the transfer of energy from input/primary to output/secondary through the energy transfer element 241. In one embodiment, controller 250 varies a parameter of switching signal 259, such as switching frequency and/or duty cycle, in response to receiving a modified input voltage sense signal 288A. At the output of switching regulator 240 the load 275 receives the regulated output through an output circuitry 260. The output voltage Vo 270 across the bulk capacitor provides load current Io 271 and either Vo 270 or Io 271 could be regulated by the controller.

Figure 2B:
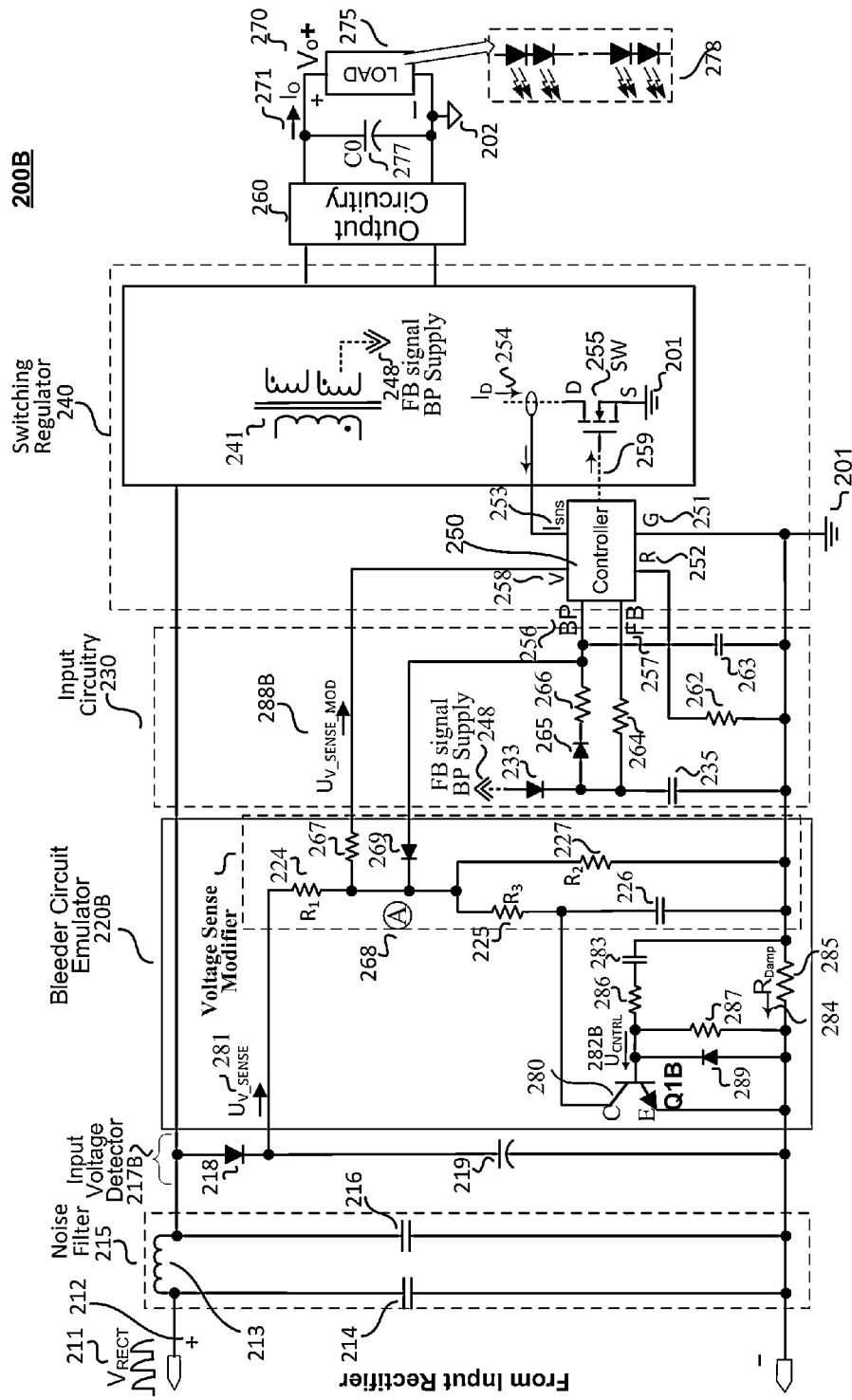
FIG. 2B is an example schematic diagram illustrating a power converter showing more detail of a bleeder circuit emulator, in accordance with the teachings of the present disclosure.

FIG. 2B is an example schematic diagram illustrating a power converter 200B showing further detail of a bleeder circuit emulator 220B, in accordance with the teachings of the present disclosure. Bleeder circuit emulator 220B is one possible implementation of bleeder circuit emulator 120B of FIG. 1B. As shown in FIG. 2B, input terminal 212 from the input rectifier receives the phase controlled rectified input voltage 211. The optional pi noise filter 215 may include inductor 213 and Y-caps 214 and 216. Rectified input voltage 211 is transferred to the input voltage detector circuit 217B and to the bleeder circuit emulator 220B. The input voltage detector circuit 217B may include diode 218 charging a capacitor 219 in order to generate a sensed input voltage signal $U_{V\_SENSE}$ 281.

In FIG. 2B, the bleeder circuit emulator 220B includes a voltage sense modifier circuitry that may receive $U_{V\_SENSE}$ signal 281 through a resistive divider and generate a scaled/modified $U_{V\_SENSE\_MOD}$ signal 288B at node "A" 268 to be applied through resistor 267 on terminal V 258 of the controller 250. The voltage signal at node "A" 268 in operations without leading edge dimming is based on the ratio of the upper resistor 224 and the lower resistor 227 of the resistive divider (e.g., $V_A = U_{V\_SENSE} * R2/(R1+R2)$).

The bleeder circuit emulator 220B differs from the bleeder circuit emulator 220A of FIG. 2A in that the activation of control signal $U_{CNTRL}$ 282B to the control terminal of transistor Q1B 280 is provided by the voltage drop on the damper resistor $R_{Damp}$ 285 due to the leading edge turn on spike current 284. The capacitor 283 at turn on spike current through the damper resistor 285 behaves as a short circuit and the voltage through the divider resistor 286 and 287 generates a high enough enabling control signal $U_{CNTRL}$ 282B to activate and turn on the transistor switch Q1B 280. The short circuits through transistor Q1B 280 across the capacitor 226 couples resistor 225 in parallel to resistor 225 which reduces the voltage signal at node "A" 268 and consequently reduces the modified input voltage sense signal $U_{V\_SENSE\_MOD}$ 288B which is transferred to the V terminal 258 of the controller 250 as a current signal through resistor 267. When transistor Q1B 280 is engaged voltage VA at node "A" may be provided as $V_A = U_{V\_SENSE} * (R_2 \| R_3)/[R_1+(R_2 \| R_3)]$.

Diode 289 across the control terminal (base terminal) of the transistor Q1B 280 has a clamping role and prevents undesirable oscillations. As described above, controller 250 processes the received signals and then generates a switching signal 259 to control switching of the switching element SW 255 to regulate transfer of energy from primary/input to secondary/output through the energy transfer element 241.

Figure 3:
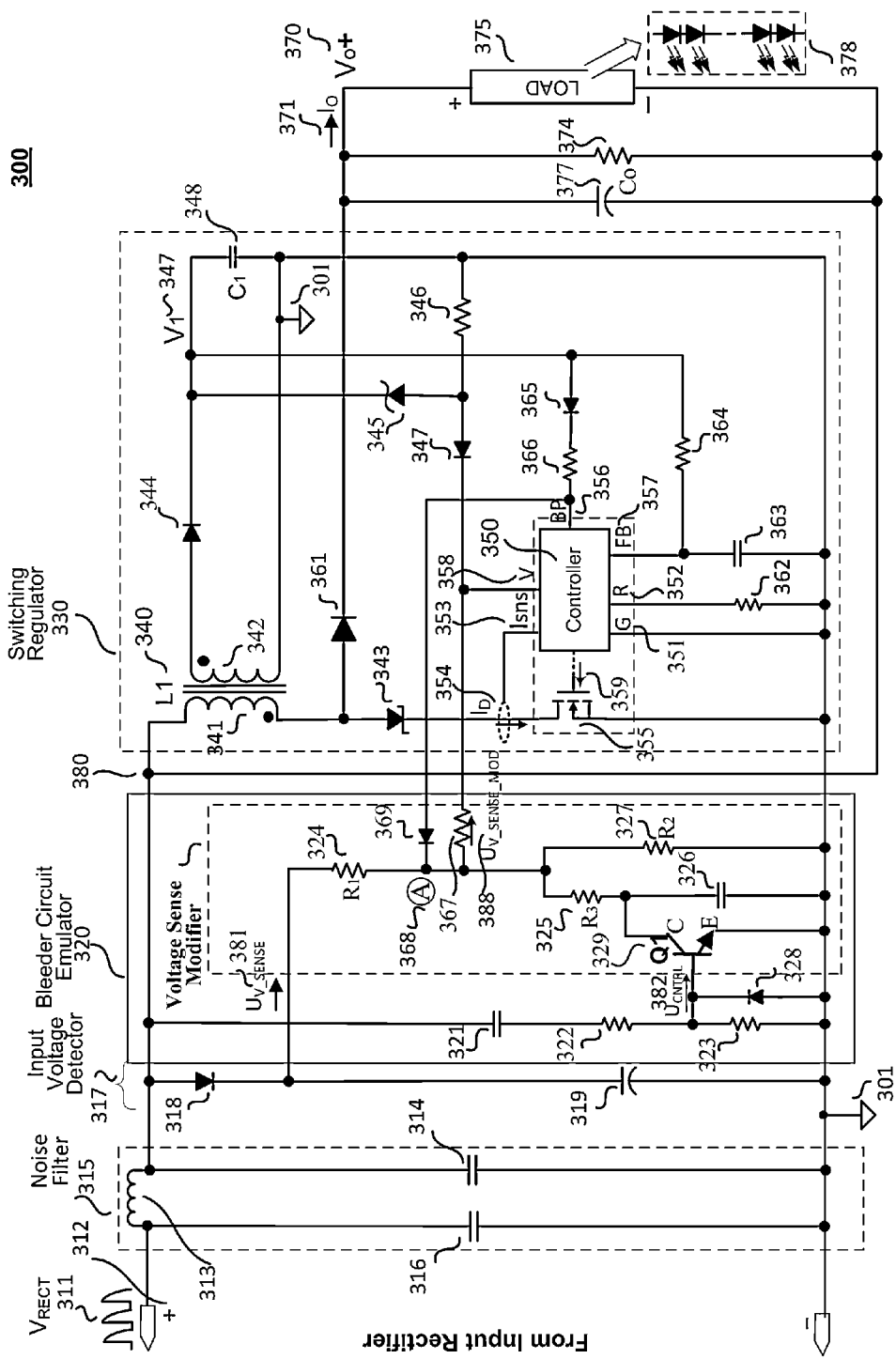
FIG. 3 is an example schematic diagram illustrating a power converter having a Buck-Boost Switching Regulator, in accordance with the teachings of the present disclosure.

FIG. 3 is an example schematic diagram illustrating a power converter 300 having a switching regulator 330, in accordance with the teachings of the present disclosure. As shown in FIG. 3, switching regulator 330 is a non-isolated Buck-Boost switching regulator with a bleeder circuit emulator 320 coupled at primary side based on teaching of the present disclosure. Input terminal 312 is coupled to receive the phase controlled rectified input voltage 311 from input rectifier and through an optional pi (π) noise filter 315 (e.g., inductor 313 plus capacitors 314 and 316) where the input voltage is applied to the input voltage detector circuit 317 (e.g., diode 318 and capacitor 319). The input voltage detector circuit 317 is configured to output a sensed input voltage signal $U_{V\_SENSE}$ 381, which is one example is representative of a magnitude value of the rectified input voltage 311.

The bleeder circuit emulator 320 includes a leading edge dimmer detection circuitry similar to the example of FIG. 2A (e.g., capacitor 321 and resistors 322 and 323) which outputs a control signal $U_{CNTRL}$ 382. The voltage sense modifier circuitry modifies input voltage sense signal $U_{V\_SENSE}$ 381, received from the leading edge dimmer detection circuitry, through a resistive divider and generates a modified $U_{V\_SENSE\_MOD}$ signal 388 at node "A" 368 and applies through resistor 367 on terminal V 358 of the controller 350. In one embodiment, as long as the rising edge of the phase controlled dimming input voltage is not detected, the voltage signal at node "A" 368 is defined by following relation: $V_A = U_{V\_SENSE} * R2/(R1+R2)$.

However, by activation of transistor switch Q1 329 (i.e., turning on) that happens upon receiving the control signal $U_{CNTRL}$ 382 on its control terminal through the leading edge dimmer detection circuit, the capacitor 326 may be shorted/bypassed, thereby coupling resistor $R_3$ 325 in parallel with resistor $R_2$ 327 and thus changing (e.g., reducing) the voltage ratio of the resistive divider as follows: $V_A = U_{V\_SENSE} * (R_2 \| R_3)/[R_1 + (R_2 \| R_3)]$.

At a rising edge of the rectified phase controlled input voltage, capacitor 321 behaves as a low impedance/short circuit and voltage through divider resistors 322 and 323 generates a high enough control signal $U_{CNTRL}$ 382 to turn on the transistor switch Q1 329 to bypasses the capacitor 226, reduce the voltage at node "A" 368 and generate a modified input voltage sense signal $U_{V\_SENSE\_MOD}$ 388 to the V terminal 358 of the controller 350. Diode 328 across the control (base) terminal of transistor Q1 380 as a protection clamps any negative oscillations on the Q1 control terminal.

The voltage at node "A" 368 presents a magnitude of the phase controlled rectified input voltage which is transferred through a resistor 367 (as a current signal $U_{V\_SENSE\_MOD}$ 388) to terminal V 358 of the controller 350 for process of input voltage information. The diode 369 from bypass terminal BP 356 to node "A" 368 guaranties that voltage at node "A" will not exceed the BP terminal voltage.

The switching regulator 330 depicts a Buck-Boost switching regulator including the controller and input/output circuitries. Switching element 355 receives the switching signal 359 from the controller 350 to turn on and off to control transfer of energy from the input to the output through the inductor winding L1 341 and through the rectifier diode 361 to the regulated output, Vo 370 and Io 371, on load 375 that in one example may be an array of LEDs 378. The capacitor Co 377 across the load may smooth the low frequency ripple and resistor 374 provides a preload. Diode 343 (in one example a schottky diode) in series with the switching element 355 may protect against the switch turn off spike rejections to the inductor winding. An auxiliary winding 342 is magnetically coupled to the winding of inductor L1 at input. The auxiliary winding 342 through a rectifier diode 344 and filter capacitance 348 provides a bypass supply for the controller on the BP terminal 356 and as well provides a feedback signal through resistor 364 representative of the load voltage on feedback terminal FB 357. At each turn on interval of the switching cycle, the current passing through the switching element 355 stores magnetic energy in the L1 inductor winding 341 but due to the anti-phase direction of the auxiliary winding 342 current is blocked by diode 344 and cannot be conducted/transferred to the capacitor 348 that provides supply to the controller. However, as a flyback effect (anti-phase coupled windings 341 and 342), during the turn off interval of the switching element 355, current can flow through the rectifier diode 344 to charge a voltage V1 347 across the capacitor $C_1$ 348. The Zener diode 345, during the overshoots across V1 347 (due to transient) conducts and injects the extra current through diode 347 to V terminal 358 to turn-off switching; wherein diode 347 blocks any return current towards the zener 345. The resistor 346 is used to prevent leakage current on zener 345 to reach V pin 358. The voltage V1 347 across capacitor $C_1$ 348 through diode 365 and resistor 366 is coupled to the BP terminal 356 and generates a bypass supply for different blocks of the controller 350. Diode 369 from BP terminal to node "A" 368 guaranties that the voltage on node "A" 368 will not go below bypass voltage on BP terminal). Voltage V1 347 across the capacitor $C_1$ 348 also provides a feedback signal from V1 347 to the FB terminal 357 of the controller 350 through the resistor 364. The feedback signal that is representative of the flux in inductor 341 and consequently representative of the transferred energy to the output is used to regulate the output (Vo 370 and Io 371). Capacitor 363 on FB terminal filters the noise.

Controller 350 may receive more function signals from the switching regulator on its other terminals. For example, current signal 354 through the switching element 355 is coupled to terminal 353 $I_{sns}$. Ground terminal 351 G of the controller 350 is referenced to the input ground 301. Modes of operation may be defined/programmed through the value of resistor 362 coupled across the multi-function terminal R 352 of the controller 350.

Controller 350 by processing all the received signals generates a switching signal 359 to control switching of the switching element SW 355 and regulate transfer of energy from input to the output across the bulk capacitor Co 377 and load 375 (e.g., an array of LEDs 378) and either Vo 370 or Io 371 could be regulated by the controller.

Figure 4A:
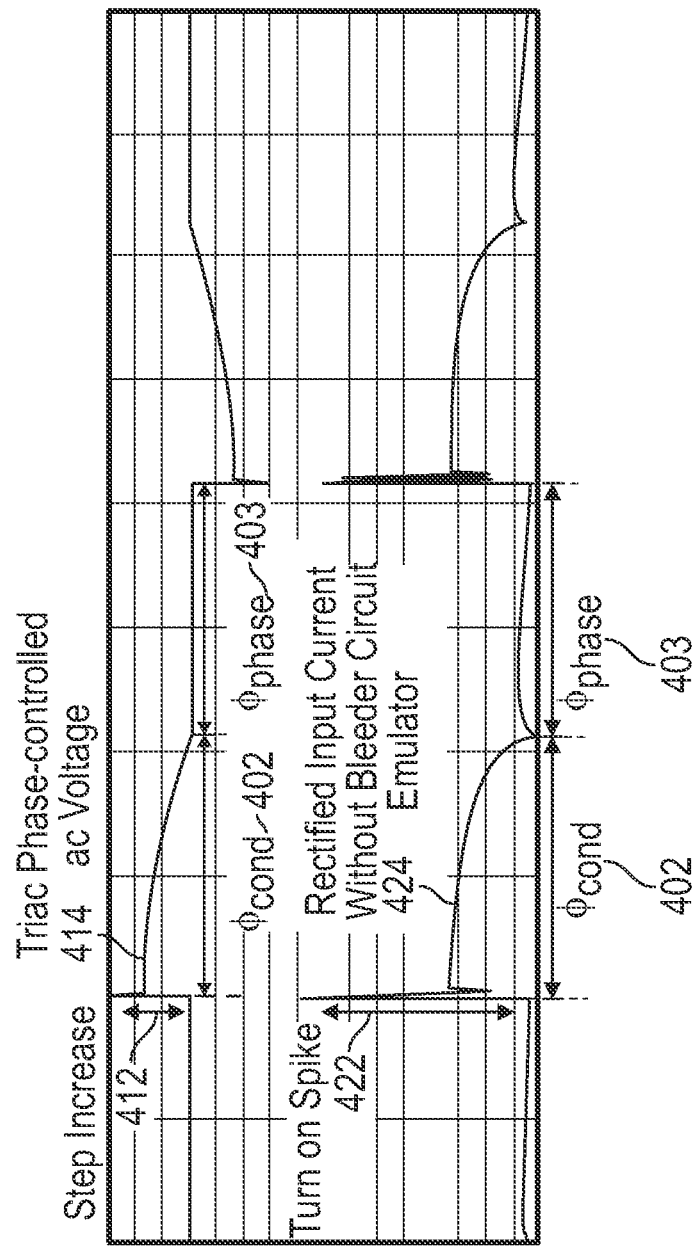
FIG. 4A illustrates example waveforms of an ac input voltage and a rectified input current of a power converter without a bleeder circuit emulator.

FIG. 4A illustrates example waveforms of an ac input voltage and a rectified input current of a power converter without a bleeder circuit emulator. The triac phase controlled ac voltage 414 shows a conduction angle $\Phi_{cond}$ 402 (e.g., illustrated around 90°) and a supplementary phase angle $\Phi_{phase}$ 403 (the removed portion from each half line cycle, e.g., around) 180−90=90°. The rising edge at triac turn on has a step increase 412. The rectified input current waveform 424 is captured without the bleeder circuit emulator activation on the LED driver. The rectified input current waveform 424 is related to the graph of triac phase controlled ac voltage 414 with the same conduction and phase angles $\Phi_{cond}$ 402 and $\Phi_{phase}$ 403. At the rising edge of triac turn on, due to the step increase 412, there is a turn on current spike 422.

Figure 4B:
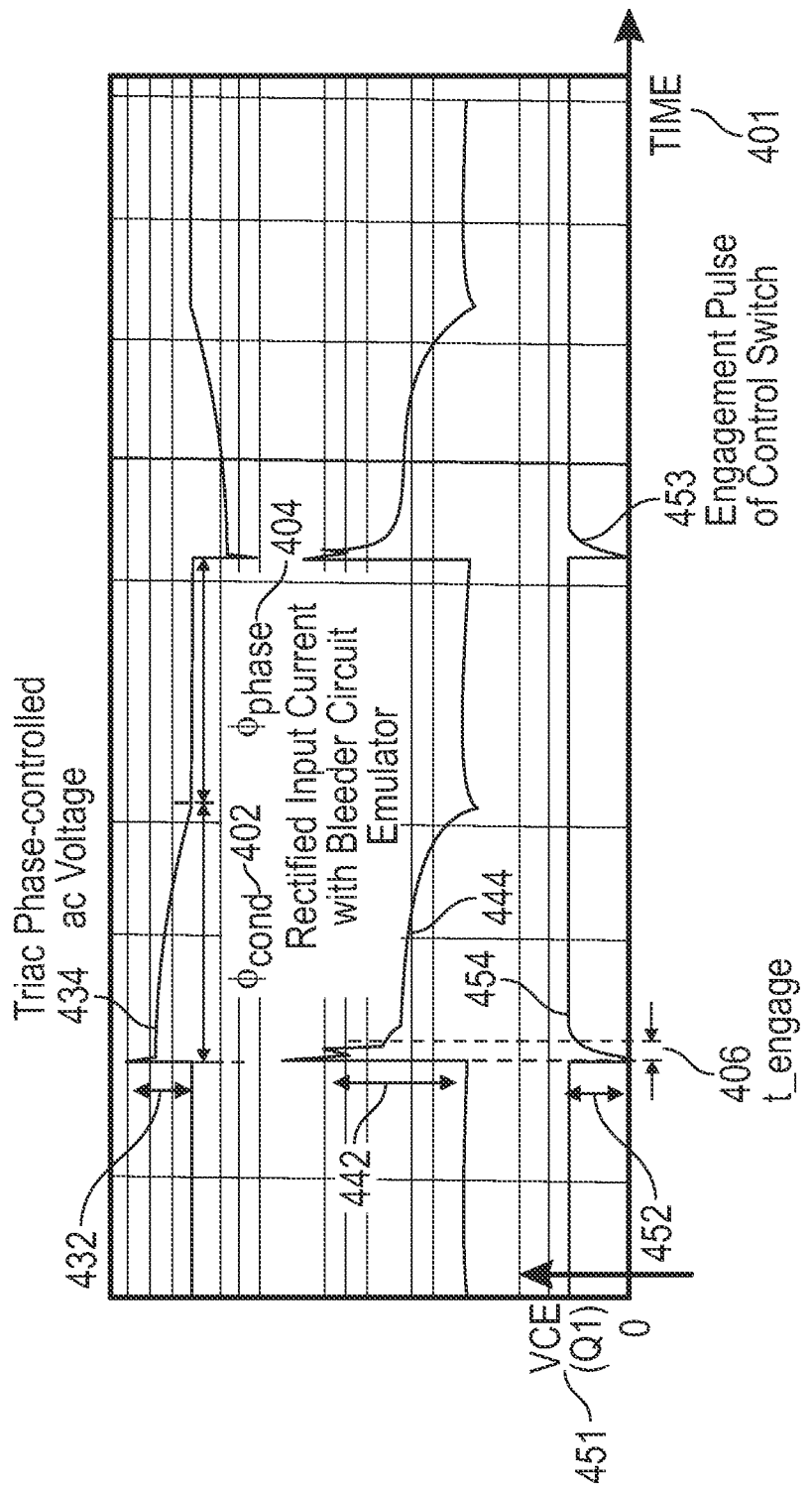
FIG. 4B illustrates example waveforms of an ac input voltage, a rectified input current, a control switch (transistor Q1) collector-to-emitter voltage, of a power converter with a bleeder circuit emulator, in accordance with the teachings of the present disclosure.

FIG. 4B illustrates example waveforms in a power converter with a bleeder circuit emulator. The waveforms include an ac input voltage, a rectified input current and a control switch (e.g., transistor Q1 in FIG. 3) collector-to-emitter voltage in accordance with the teachings of the present disclosure. The triac phase controlled ac input voltage 434 has a rising edge 432 and in each half line cycle has a conduction angle $\Phi_{cond}$ 402 and a phase angle $\Phi_{phase}$ 403 which are supplementary. The rectified input current waveform 444 in FIG. 4B is captured after adding/activating the bleeder circuit emulator based on teaching of the present disclosure. The rectified input current waveform 444 is related to the graph of triac phase controlled ac voltage 434 and shows a reduced turn on current spike 442 at rising edge of triac turn on 432.

The third graph in FIG. 4B shows the collector-to-emitter voltage $V_{CE}$ 451 on the control switch of the bleeder circuit emulator (e.g., transistor Q1A in FIG. 2A or transistor Q1 in FIG. 3). In accordance with the teachings of the present disclosure the control signal (e.g., $U_{CNTL}$ 282A in FIG. 2A or 382 in FIG. 3) is only activated at rising edge of triac turn on 432, in order to turn on the control switch (transistor Q1A in FIG. 2A or Q1 in FIG. 3). When engaged, the collector-to-emitter voltage $V_{CE}$ 451 drops to zero with a step change 452. During the short interval of $t\_{engage}$ 406 and at the rising edge of triac turn on, the engagement pulse 453 of the control switch pulls the collector-to-emitter voltage $V_{CE}$ 451 to zero. However, other than this short interval of $t\_{engage}$ 406, in all other intervals of the conduction angle $\Phi_{cond}$ 402 and phase angle $\Phi_{phase}$ 403, the collector-to-emitter voltage $V_{CE}$ 451 of the control switch remains on the high level 454 of the charged voltage across capacitor 226 in FIG. 2A or 326 in FIG. 3.

FIG. 4C illustrates example half a cycle waveforms of an ac input voltage, and a comparison of the rectified input currents with and without a bleeder circuit emulator in accordance with the teachings of the present disclosure. At triac turn on there is a rising edge 462 and during the conduction angle $\Phi_{cond}$ 402 the phase-controlled input voltage 462 follows the sinusoidal line voltage. The second graph in FIG. 4C shows the saved scope captures of the input current with and without a bleeder circuit emulator (waveforms 475 and 474 respectively) in the same scale for comparison. It obviously endorses/confirms the reduced and improved turn on current spike (473 in comparison to 472) at presence of a bleeder circuit emulator in accordance with the teachings of the present disclosure.

Figure 5:
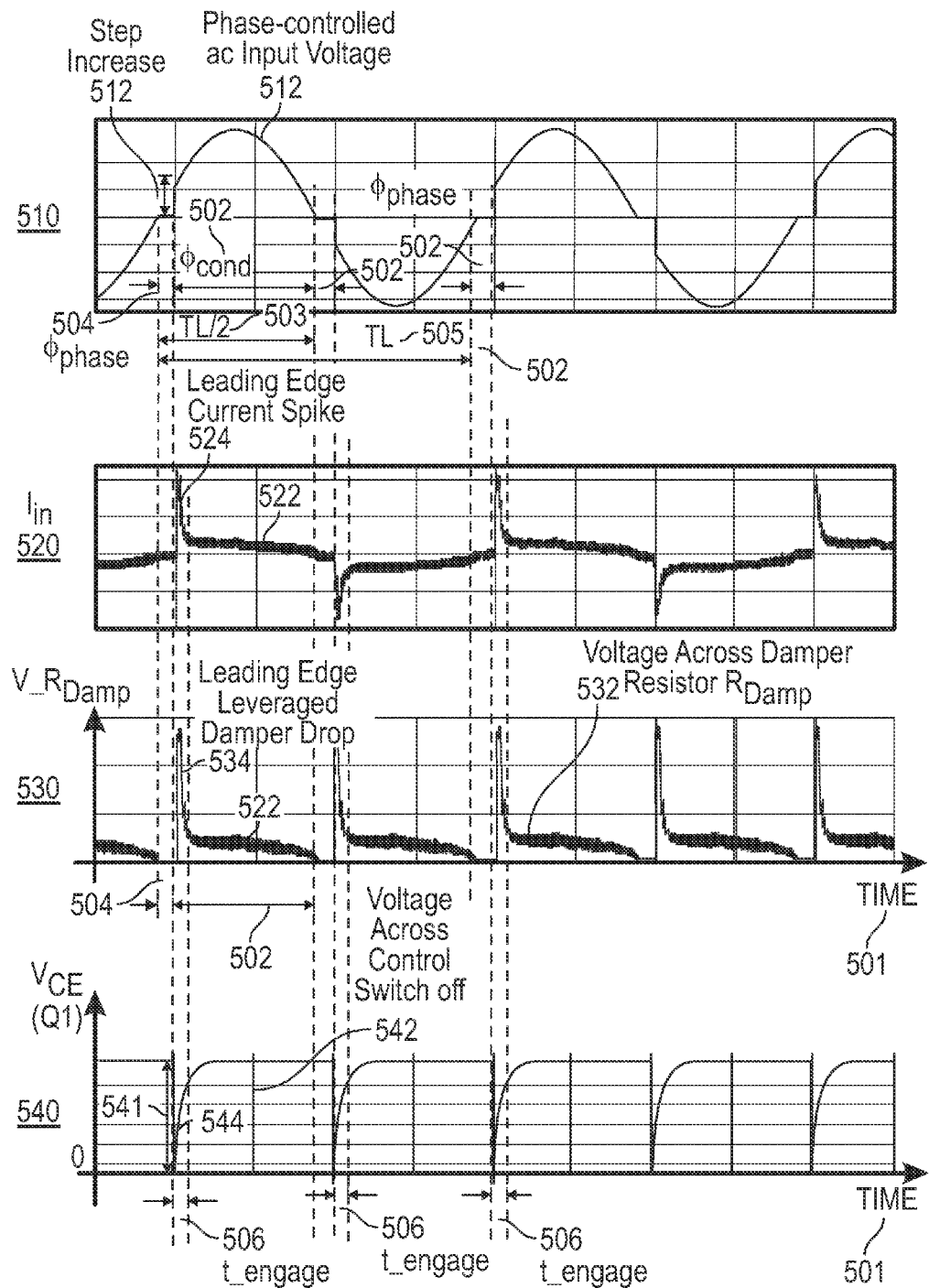
FIG. 5 illustrates example waveforms of a phase-controlled ac input voltage, an ac input current, a voltage across a damper resistor, a control switch collector-to-emitter voltage, and high frequency switching pulses of a power converter with a bleeder circuit emulator.

FIG. 5 illustrates example waveforms of a phase-controlled ac input voltage, an ac input current, a voltage across a damper resistor and a control switch collector-to-emitter voltage for a power converter with a bleeder circuit emulator. The example waveforms of FIG. 5 will be described with reference to the bleeder circuit emulator 220B of FIG. 2B.

Graph 510 presents a triac phase-controlled ac input voltage with leading edge dimming. In each half line cycle TL/2 503 of the ac line cycle TL 505. The removed portion is called phase angle $\Phi_{phase}$ 504 (e.g., illustrated about 20°) and the conducted portion through triac is called conduction angle $\Phi_{cond}$ 502 (e.g., illustrated about 160°). At the triac turn on rising edge the step increase 512 in triac voltage causes a leading edge spike current 524. The input current $I_{in}$ 520 after the leading edge spike 524 and during the triac conduction $\Phi_{cond}$ 502 follows the sinusoidal waveform of the phase controlled input voltage 512.

A damper resistor is coupled series in the return line current path at the rectified side of the bridge rectifier and the voltage drop across it is illustrated on graph 530 $V\_R_{Damp}$.

Graph 530 shows a leveraged voltage 534 due to the turn on current spike drop on the damper resistor and afterwards during the triac conduction $\phi_{cond}$ 502 the voltage drop 532 due to the input ac current follows the sinusoidal waveform of the phase controlled input voltage 512.

Graph 540 presents the collector-to-emitter voltage $V_{CE}$ of a control switch (transistor Q1B in FIG. 2B). At triac turn on rising edge the collector-to-emitter voltage $V_{CE}$ 540 drops to zero with a step change 541. During the short interval of $t\_{engage}$ 506 at rising edge of the triac turn on, the engagement pulse 544 of the control switch pulls the collector-to-emitter voltage $V_{CE}$ 540 to zero. However, other than this short interval of $t\_{engage}$ 506, in all other intervals of the conduction angle $\Phi_{cond}$ 502 and phase angle $\Phi_{phase}$ 504 the control switch remains in off state and the collector-to-emitter voltage ($V_{CE}$ 540) remains on the high level 542 which is the charged voltage across the capacitor 226 in FIG. 2B.

What is claimed is:

1. A bleeder circuit emulator for use in a power converter, the bleeder circuit emulator comprising:
    an input voltage modifier to be coupled to receive an input voltage signal that is representative of a magnitude of an input voltage of the power converter and to selectively provide a modified input voltage signal to an input of a controller in response to receiving a control signal, wherein the modified input voltage signal is representative of a value that is less than the magnitude of the input voltage; and
    a leading edge dimming detection circuit coupled to generate the control signal to engage the input voltage modifier to generate the modified input voltage signal in response to detecting leading edge dimming at an input of the power converter, wherein the leading edge dimming detection circuit further comprises:
    a first capacitance coupled to the input of the power converter;
    a first resistance coupled to a reference of the power converter; and
    a second resistance coupled between the first capacitance and the first resistance, wherein the control signal is a voltage across the first resistance that develops in response to leading edge dimming at the input of the power converter.

2. The bleeder circuit emulator of claim 1, wherein the leading edge dimming detection circuit is configured to generate the control signal to engage the input voltage modifier to generate the modified input voltage signal only during an engagement time that begins responsive to a step increase in the input voltage, wherein the step increase in the input voltage corresponds with the turning on of the input voltage of the power converter by a dimming circuit during leading edge dimming.

3. The bleeder circuit emulator of claim 1, wherein the input voltage modifier is configured to provide the input voltage signal to the input of the controller when disengaged.

4. The bleeder circuit emulator of claim 3, wherein the control signal keeps the input voltage modifier disengaged in response to trailing edge dimming at the input of the power converter.

5. The bleeder circuit emulator of claim 3, wherein the control signal keeps the input voltage modifier disengaged in response to the absence of dimming at the input of the power converter.

6. The bleeder circuit emulator of claim 1, wherein the leading edge dimming detection circuit is coupled to generate the control signal to engage the input voltage modifier only in response to detecting leading edge dimming at the input of the power converter.

7. The bleeder circuit emulator of claim 1, wherein the input voltage modifier comprises a switch coupled to reduce the magnitude of the input voltage signal to generate the modified input voltage signal when the switch is enabled, wherein the switch is enabled in response to the control signal.

8. The bleeder circuit emulator of claim 1, wherein the leading edge dimming detection circuit is coupled to detect a current spike in a rectified input current of the power converter, and to generate the control signal to engage the input voltage modifier in response thereto, wherein the current spike corresponds with the turning on of an input voltage of the power converter by a dimming circuit during leading edge dimming.

9. The bleeder circuit emulator of claim 8, wherein the leading edge dimming detection circuit comprises a current sense resistance coupled such that the rectified input current flows through the current sense resistance.

10. A power converter, comprising:
an energy transfer element coupled between an input and an output of the power converter;
a first switch coupled to the energy transfer element to control a transfer of energy between the input and the output of the power converter;
a controller coupled to control the first switch to regulate an output quantity at the output of the power converter in response to a signal received at a terminal of the controller; and
a bleeder circuit emulator coupled to provide the signal to the terminal of the controller, the bleeder circuit emulator including:
a leading edge dimming detection circuit coupled to generate a control signal that indicates whether leading edge dimming is present at the input of the power converter, wherein the leading edge dimming detection circuit further comprises:
a first capacitance coupled to the input of the power converter;
a first resistance coupled to a common reference of the power converter; and
a second resistance coupled between the first capacitance and the first resistance, wherein the control signal is a voltage across the first resistance that develops in response to leading edge dimming at the input of the power converter; and
an input modifier coupled to receive an input signal and to selectively provide either the input signal or a modified input signal to the terminal of the controller, wherein the input modifier provides the input signal to the terminal in response to the control signal indicating that there is no leading edge dimming at the input of the power converter and provides the modified input signal to the terminal in response to the control signal indicating that there is leading edge dimming, wherein the controller is configured to control the switch to increase the output quantity of the power converter in response to receiving the modified input signal.

11. The power converter of claim 10, wherein the input signal is an input voltage signal that is representative of a magnitude of an input voltage of the power converter, wherein the modified input signal is representative of a value that is less than the magnitude of the input voltage.

12. The power converter of claim 11, wherein the leading edge dimming detection circuit is configured to generate the control signal to engage the input modifier to generate the modified input signal only during an engagement time that begins responsive to a step increase in the input voltage, wherein the step increase in the input voltage corresponds with the turning on of the input voltage of the power converter by a dimming circuit during leading edge dimming.

13. The power converter of claim 10, wherein the output quantity regulated by the controller is an output current of the power converter, and wherein the controller controls the first switch to increase the output current by increasing a parameter of the first switch in response to receiving the modified input signal, wherein the parameter is selected from the group consisting of duty ratio and switching frequency.

14. The power converter of claim 10, wherein the controller is configured to maintain an input current of the power converter to be equal to or greater than a minimum current in response to receiving the modified input signal.

15. The power converter of claim 10, wherein the input modifier comprises a second switch coupled to reduce the magnitude of the input voltage signal to generate the modified input signal when the second switch is enabled, wherein the second switch is enabled in response to the control signal indicating the presence of leading edge dimming at the input of the power converter.

16. The power converter of claim 10, wherein the leading edge dimming detection circuit is coupled to detect a current spike in a rectified input current of the power converter, and to generate the control signal to engage the input modifier in response thereto, wherein the current spike corresponds with the turning on of an input voltage of the power converter by a dimming circuit during leading edge dimming.

17. The power converter of claim 16, wherein the leading edge dimming detection circuit comprises a current sense resistance coupled such that the rectified input current flows through the current sense resistance.

18. An apparatus, comprising:
a load; and
a power converter coupled to provide a regulated output current to the load, the power converter comprising:
an energy transfer element coupled between an input and an output of the power converter;
a first switch coupled to the energy transfer element to control a transfer of energy between the input and the output of the power converter;
a controller coupled to control the first switch to regulate the output current in response to a signal received at a terminal of the controller; and
a bleeder circuit emulator coupled to provide the signal to the terminal of the controller, the bleeder circuit emulator including:
a leading edge dimming detection circuit coupled to generate a control signal that indicates whether leading edge dimming is present at the input of the power converter wherein the leading edge dimming detection circuit is coupled to detect a current spike in a rectified input current of the power converter, and to generate the control signal to engage the input modifier to provide the modified input signal in response thereto, wherein the current spike corresponds with the turning on of an input voltage of the power converter by a dimming circuit during leading edge dimming; and an input modifier coupled to receive an input signal and to selectively provide either an input voltage signal or a modified input signal to the terminal of the controller, wherein the input modifier provides the input voltage signal to the terminal in response to the control signal indicating that there is no leading edge dimming at the input of the power converter and provides the modified input signal to the terminal in response to the control signal indicating that there is leading edge dimming, wherein the controller is configured to control the switch to increase the output quantity of the power converter in response to receiving the modified input signal.

19. The apparatus of claim 18, wherein the load includes one or more light emitting diodes (LEDs).

* * * * *